United States Patent
Tse et al.

(10) Patent No.: US 11,956,125 B2
(45) Date of Patent: Apr. 9, 2024

(54) NETWORK MANAGEMENT

(71) Applicant: Telefonaktiebolaget LM Ericsson (publ), Stockholm (SE)

(72) Inventors: Edwin Tse, Montreal (CA); Robert Petersen, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/908,170

(22) PCT Filed: Apr. 30, 2020

(86) PCT No.: PCT/EP2020/062170
§ 371 (c)(1),
(2) Date: Aug. 30, 2022

(87) PCT Pub. No.: WO2021/219232
PCT Pub. Date: Nov. 4, 2021

(65) Prior Publication Data
US 2023/0362059 A1 Nov. 9, 2023

(51) Int. Cl.
*H04L 41/0895* (2022.01)
*H04L 41/082* (2022.01)

(52) U.S. Cl.
CPC ........ *H04L 41/0895* (2022.05); *H04L 41/082* (2013.01)

(58) Field of Classification Search
CPC ............... H04L 41/0895; H04L 41/082; H04L 41/0677; H04L 41/0806; H04L 41/40;
(Continued)

(56) References Cited

U.S. PATENT DOCUMENTS

2019/0261186 A1    8/2019    Xu et al.

FOREIGN PATENT DOCUMENTS

| WO | 2019056960 A1 | 3/2019 |
| WO | 2019141089 A1 | 7/2019 |
| WO | 2019145049 A1 | 8/2019 |

OTHER PUBLICATIONS

"3GPP TS 28.541 V16.4.0", 3rd Generation Partnership Project; Technical Specification Group Services and System Aspects; Management and orchestration; 5G Network Resource Model (NRM); Stage 2 and stage 3 (Release 16), Mar. 2020, pp. 1-324.
(Continued)

*Primary Examiner* — Karen C Tang
(74) *Attorney, Agent, or Firm* — Murphy, Bilak & Homiller, PLLC

(57) ABSTRACT

There is provided a method for network management performed by a first entity (10), which is configured to manage network slices in a network. The method is performed in response to a first request to set up a first network slice. The method comprises identifying (102) one or more network nodes in the network and/or one or more second network slices to support the first network slice. For each identified network node, an update to an attribute of the identified network node is initiated (104) to add a unique identifier of the first network slice to the attribute of the identified network node. For each identified second network slice, an update to an attribute of the identified second network slice is initiated (106) to add the unique identifier of the first network slice to the attribute of the identified second network slice.

11 Claims, 7 Drawing Sheets

(58) Field of Classification Search
CPC ........... H04L 41/5009; G06F 2209/508; G06F 9/5077
USPC ........................................................ 709/221
See application file for complete search history.

(56) References Cited

OTHER PUBLICATIONS

"3GPP TS 28.622 V16.3.0", 3rd Generation Partnership Project; Technical Specification Group Services and System Aspects; Telecommunication management; Generic Network Resource Model (NRM) Integration Reference Point (IRP); Information Service (IS) (Release 16), Mar. 2020, pp. 1-50.

"3GPP TS 32.111-2 V15.1.0", 3rd Generation Partnership Project; Technical Specification Group Services and System Aspects; Telecommunication management; Fault Management; Part 2: Alarm Integration Reference Point (IRP): Information Service (IS) (Release 15), Jun. 2019, pp. 1-71.

"3GPP TS 32.300 V15.0.0", 3rd Generation Partnership Project; Technical Specification Group Services and System Aspects; Telecommunication management; Configuration Management (CM); Name convention for managed objects (Release 15), Jun. 2018, pp. 1-27.

"5G Network Slicing", https://en.wikipedia.org/wiki/5G_network_slicing, Feb. 16, 2022, pp. 1-8.

"3GPP TS 28.532 V16.2.0", 3rd Generation Partnership Project; Technical Specification Group Services and System Aspects; Management and orchestration; Generic management services; (Release 16), Dec. 2019, pp. 1-228.

"3GPP TS 28.530 V15.2.0", 3rd Generation Partnership Project; Technical Specification Group Services and System Aspects; Management and orchestration; Concepts, use cases and requirements (Release 15), Sep. 2019, pp. 1-29.

For each network node that is to support a first network slice, initiate an update to an attribute of the network node — 202

NETWORK MANAGEMENT

TECHNICAL FIELD

The disclosure relates to methods for network management and entities configured to operate in accordance with those methods.

BACKGROUND

Networks are managed by network operators and customers of the network operators use the network. Different customers of a network operator have different needs. It can be difficult for a network operator to meet all of these different needs. A technique that is currently used by network operators to aid in supporting the different needs of customers is network slicing. Network slicing can be used by a network operator to construct, out of a network of managed functions, customised logical networks for different customers. The logical networks can be customised to meet certain requirements, such as an individual customer's needs. The customised logical networks are called network slices. A network slice can be defined as an (e.g. isolated, separate, or self-contained) end-to-end network. A network slice can be, for example, a portion of a physical network that connects two or more logical network interfaces or devices. Herein, a network slice may also be referred to as a subnetwork.

In a sliced network, it can be common for a network slice to require the support of multiple managed network nodes (e.g. physical nodes, such as base stations, and/or virtual nodes, such as functions), for a managed element to be a member of (i.e. support) one or more network slices, and for a network slice to be a member of (i.e. support) one or more other network slices. For example, a network slice S-1 may be supported by a group of network slices S-11 and S-12 and one or more managed network nodes. Moreover, the supporting network slices S-11 and S-12 can themselves be supported by a group of network slices and one or more managed network nodes. The network slice S-1 and its supporting (or subordinate) network slices S-11 and S-12 and the one or more managed network nodes is called a network slice tree.

There currently exist systems that are configured to report faults in a network. However, there are various problems associated with these existing fault reporting systems.

In some of the existing fault reporting systems, when a fault is detected, an alarm report may be generated from the faulty managed network node (e.g. base station or function). This alarm report may carry a distinguished name (DN) of the faulty managed network node. In the management of physical (not logical) networks, the use of the DN of a faulty managed network node is enough for a receiver (e.g. consumer) of the alarm report to determine the identities of entities that may be affected by the faulty managed network node. In an example, Subnetwork-1 may contain Subnetwork-2, which in turn may contain ManagedElement-3, which in turn may contain ManagedFunction-4. In this example, the DN of ManagedFunction-4 may carry the DN of ManagedElement-3, which in turn may carry the DN of Subnetwork-2, which in turn may carry the DN of Subnetwork-1. However, in the management of a logical network (such as a group of network slices), the DN of a faulty managed network node does not reveal the identity of the network slice(s) that the faulty managed network node is supporting and it is thus not possible to determine from the alarm report which network slice(s) may be underperforming as a result of the faulty managed network node.

As such, it is currently the case that any attempt to determine if the underperformance of network slices is caused by a common faulty managed network node is a complex task, as it requires navigating from each underperforming network slice 'downwards', possibly through multiple levels of the network, onto the faulty managed network nodes to determine if those faulty managed network nodes are the same managed network node.

SUMMARY

It is an object of the disclosure to obviate or eliminate at least some of the above-described disadvantages associated with existing techniques.

Therefore, according to an aspect of the disclosure, there is provided a method for network management. The method is performed by a first entity. The first entity is configured to manage network slices in a network. The method is performed in response to a first request to set up a first network slice in the network. The method comprises identifying one or more network nodes in the network and/or one or more second network slices in the network to support the first network slice. The method comprises, for each identified network node, initiating an update to an attribute of the identified network node to add a unique identifier of the first network slice to the attribute of the identified network node. The method comprises, for each identified second network slice, initiating an update to an attribute of the identified second network slice to add the unique identifier of the first network slice to the attribute of the identified second network slice.

There is thus provided an advantageous method for network management. In particular, it is possible to identify which network slice(s) are using which network node(s) and/or which other network slice(s) simply by reading the relevant attribute(s). In this way, the cause of any issue with a network slice can more easily and more efficiently be identified. This is possible without having to examine information in a management information base. Instead, the attributes provide the information needed to identify the cause of such an issue (e.g. to determine affected network slices given a unique identifier (e.g. DN) of a faulty network node).

In some embodiments, it may be that the first network slice is to be supported directly by one or more identified network nodes and/or indirectly by one or more identified network nodes via one or more identified second network slices.

In some embodiments, it may be that the first network slice is to be supported directly by one or more identified second network slices or indirectly by one or more identified second network slices via one or more other identified second network slices.

In some embodiments, initiating the update to the attribute of the identified network node may comprise initiating transmission of a second request towards a second entity for the attribute of the identified network node to be updated, wherein the second entity is configured to manage network nodes in the network.

In some embodiments, initiating the update to the attribute of the identified second network slice may comprise causing the attribute of the identified second network slice to be updated at a management information base, wherein the management information base is configured to store information on each network node in the network and each network slice in the network.

In some embodiments, the method may comprise, in response to a third request to remove the first network slice from the network, identifying one or more network nodes in the network and/or one or more second network slices in the network supporting the first network slice. The method may comprise, for each identified network node, initiating removal of the unique identifier of the first network slice from the attribute of the identified network node and, for each identified second network slice, initiating removal of the unique identifier of the first network slice from the attribute of the identified second network slice. In this way, the attribute(s) can be kept up to date and thus provide reliable information.

In some embodiments, initiating removal of the unique identifier of the first network slice from the attribute of the identified network node may comprise initiating transmission of a fourth request towards a second entity for the unique identifier of the first network slice to be removed from the attribute of the identified network node, wherein the second entity is configured to manage network nodes in the network.

In some embodiments, initiating removal of the unique identifier of the first network slice from the attribute of the identified second network slice may comprise causing the unique identifier of the first network slice to be removed from the attribute of the identified second network slice at a management information base, wherein the management information base is configured to store information on each network node in the network and each network slice in the network.

In some embodiments, the method may comprise, in response to detection of an underperforming network slice, initiating transmission of a report on the underperforming network slice, wherein the report comprises a unique identifier of the underperforming network slice, a unique identifier of one or more network slices supported by the underperforming network slice, and information indicating that the underperforming network slice is underperforming. In this way, valuable information identifying which network slice(s) may be affected by the underperforming network slice can be provided.

In some embodiments, the method may comprise initiating transmission of the report towards a third entity, wherein the third entity is configured to operate the network.

According to another aspect of the disclosure, there is provided a first entity. The first entity comprises processing circuitry configured to operate in accordance with the method described earlier in respect of the first entity. The first entity thus provides the advantages discussed earlier in respect of the method performed by the first entity. In some embodiments, the first entity may comprise at least one memory for storing instructions which, when executed by the processing circuitry, cause the first entity to operate in accordance with the method described earlier in respect of the first entity.

According to another aspect of the disclosure, there is provided another method for network management. The method is performed by a second entity. The second entity is configured to manage network nodes in a network. The method comprises, for each network node in the network that is to support a first network slice to be set up in the network, initiating an update to an attribute of the network node to add a unique identifier of the first network slice to the attribute of the network node.

There is thus provided an advantageous method for network management. In particular, it is possible to identify which network slice(s) are using which network node(s) simply by reading the relevant attribute(s). In this way, the cause of any issue with a network slice can more easily and more efficiently be identified. This is possible without having to examine information in a management information base. Instead, the attributes provide the information needed to identify the cause of such an issue (e.g. to determine affected network slices given a unique identifier (e.g. DN) of a faulty network node).

In some embodiments, initiating the update to the attribute of the network node may comprise, causing the attribute of the network node to be updated at a management information base, wherein the management information base is configured to store information on each network node in the network and each network slice in the network.

In some embodiments, the method may comprise initiating the update to the attribute of the network node in response to a second request for the attribute of the network node to be updated.

In some embodiments, it may be that the first network slice is to be supported directly by one or more network nodes in the network and/or indirectly by one or more network nodes in the network via one or more second network slices in the network.

In some embodiments, the method may comprise, in response to a fourth request for the unique identifier of the first network slice to be removed from an attribute of one or more network nodes in the network supporting the first network slice, causing the unique identifier of the first network slice to be removed from the attribute of the one or more network nodes at a management information base, wherein the management information base is configured to store information on each network node in the network and each network slice in the network. In this way, the attribute(s) can be kept up to date and thus provide reliable information.

In some embodiments, the method may comprise, in response to detection of a faulty network node in the network, acquiring, from an attribute of the faulty network node, a unique identifier of each network slice that the faulty network node is supporting and initiating transmission of a report on the faulty network node, wherein the report comprises a unique identifier of the faulty network node and the acquired unique identifier of each network slice that the faulty network node is supporting. In this way, the receiver of the report can know the identity of the faulty network node and also valuable information on the network slice(s) that may be affected by the fault. This can be beneficial for the immediate determination of appropriate corrective actions.

In some embodiments, the method may comprise, in response to detection of a faulty network node in the network, acquiring, from an attribute of each network slice that the faulty network node is supporting, a unique identifier of each additional network slice supported by each network slice that the faulty network node is supporting, and initiating transmission of a report on the faulty network node, wherein the report comprises a unique identifier of the faulty network node and the acquired unique identifier of each additional network slice. In this way, the receiver of the report can know the identity of the faulty network node and also valuable information on the network slice(s) that may be affected by the fault. This can be beneficial for the immediate determination of appropriate corrective actions.

In some embodiments, the method may comprise initiating transmission of the report towards a first entity, wherein the first entity is configured to manage network slices in a network. This can be beneficial as the first entity does manage network nodes but will nevertheless become aware of the network slice(s) that might be affected by a faulty network node. In this way, useful information is available for informing a customer. In some embodiments, the method may comprise initiating transmission of the report towards a third entity, wherein the third entity is configured to operate the network. This can be beneficial as the third entity does not manage network slices but will nevertheless become aware of a faulty network node that might be affecting network slice(s). In this way, useful information is available for corrective action to be taken on the faulty network node.

According to another aspect of the disclosure, there is provided a second entity. The second entity comprises processing circuitry configured to operate in accordance with the method described earlier in respect of the second entity. The second entity thus provides the advantages discussed earlier in respect of the method performed by the second entity. In some embodiments, the second entity may comprise at least one memory for storing instructions which, when executed by the processing circuitry, cause the second entity to operate in accordance with the method described earlier in respect of the second entity.

According to another aspect of the disclosure, there is provided a method performed by a system. The method performed by the system may comprise the method performed by the first entity as described earlier and the method performed by the second entity as described earlier. The method performed by the system thus provides the advantages discussed earlier in respect of the method performed by the first entity and the method performed by the second entity.

According to another aspect of the disclosure, there is provided a system. The system may comprise at least one first entity as described earlier and at least one second entity as described earlier. The system thus provides the advantages discussed earlier in respect of the method performed by the first entity and the second entity.

According to another aspect of the disclosure, there is provided a computer program comprising instructions which, when executed by processing circuitry, cause the processing circuitry to perform the method described earlier in respect of the first entity and/or second entity. The computer program thus provides the advantages discussed earlier in respect of the method performed by the first entity and/or second entity.

According to another aspect of the disclosure, there is provided a computer program product, embodied on a non-transitory machine readable medium, comprising instructions which are executable by processing circuitry to cause the processing circuitry to perform the method described earlier in respect of the first entity and/or second entity. The computer program product thus provides the advantages discussed earlier in respect of the method performed by the first entity and/or second entity.

Therefore, advantageous techniques for network management are provided.

BRIEF DESCRIPTION OF THE DRAWINGS

For a better understanding of the techniques, and to show how they may be put into effect, reference will now be made, by way of example, to the accompanying drawings, in which.

DETAILED DESCRIPTION

As mentioned earlier, advantageous techniques for network management are described herein. The techniques described herein can be used in respect of any network, such as any communications network. The network may be a fifth generation (5G) network or any other generation network. The network may be a core network or a radio access network (RAN). The techniques are implemented by a first entity and/or a second entity.

Figure 1:
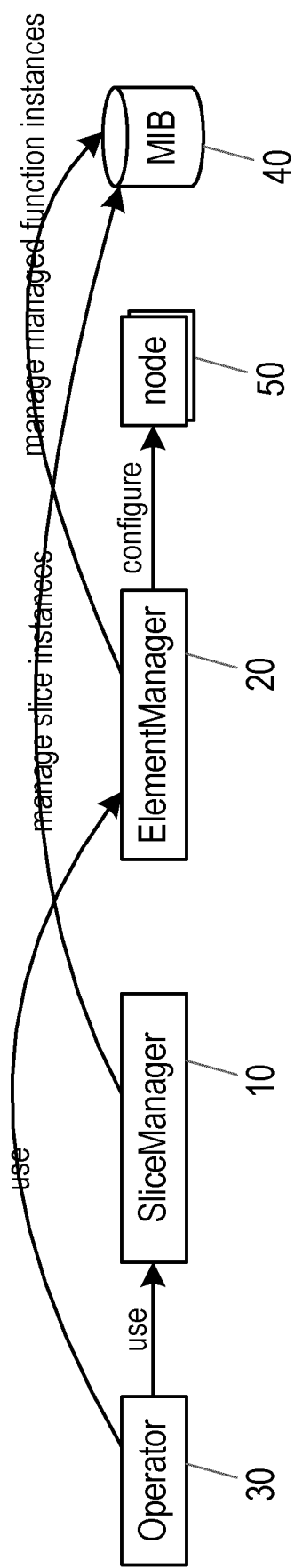
FIG. 1 is a block diagram illustrating a system according to an embodiment.

FIG. 1 illustrates a system comprising such a first entity 10 and second entity 20 in accordance with an embodiment. The system is for network management. In the system illustrated in FIG. 1, the first entity 10 is a network slice manager and the second entity 20 is a network node (or element) manager. That is, the first entity 10 is configured to manage one or more network slices in a network and the second entity 20 is configured to manage (e.g. configure) one or more network nodes (or elements) 50 in the network. Herein, a group of network slices form a logical network. In some embodiments, as illustrated in FIG. 1, the system can also comprise an operator terminal 30, the one or more network nodes 50, and/or a management information base (MIB) 40.

The operator terminal 30 can be any terminal for use by an operator of the network. For example, the operator terminal 30 may be a mobile device in some embodiments. The operator terminal 30 can communicate with the first entity 10 and/or the second entity 20. An operator of the network can interact with the operator terminal 30 to communicate with the first entity 10 and/or the second entity 20. For example, the operator terminal 30 can comprise a user interface for use by an operator of the network. Thus, in some embodiments, there can be a computer-to-computer interface for interacting with the first entity 10 and/or the second entity 20. In other embodiments, an operator of the network may interact directly with the first entity 10 and/or second entity 20, e.g. using a user interface of the first entity 10 and/or second entity 20. The operator of the network can operate the system illustrated in FIG. 1. The operator can manage the one or more network slices via the first entity 10 and/or the one or more network nodes 50 via the second entity 20. The one or more network nodes 50 may comprise any type and/or any combination of nodes.

The MIB 40 can be configured to store software objects representing any elements of the network that can be managed, e.g. any network nodes and/or network slices of the network. For example, the MIB 40 can be configured to store information on each network node in the network and/or each network slice in the network. In some embodiments, the MIB 40 can be configured to store information which collectively represents all deployed network nodes in the network and/or all network slices in the network. The first entity 10 and/or second entity 20 can communicate with the MIB 40. The first entity 10 can communicate with the MIB 40 to manage one or more network slices in the network. The second entity 20 can communicate with the MIB 40 to manage one or more network nodes of the network.

Herein, a network node may be a physical network node (e.g. a base station, such as a radio base station) or a virtual network node (e.g. a function). In some embodiments, a function referred to herein may be an instance of a function, which can also be referred to as a function instance. Similarly, in some embodiments, a network slice referred to herein may be an instance of a network slice, which can also be referred to as a network slice instance.

Figure 2:
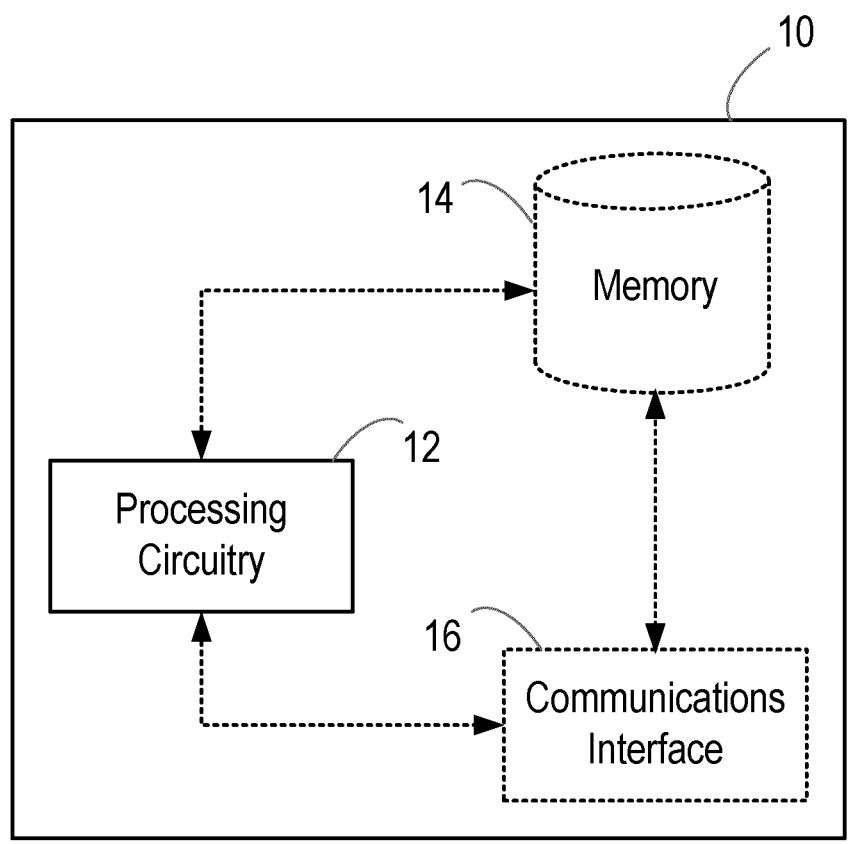
FIG. 2 is a block diagram illustrating a first entity according to an embodiment.

FIG. 2 illustrates a first entity 10 in accordance with an embodiment. The first entity 10 is for managing services in a network. The first entity 10 may, for example, be a physical machine (e.g. a server) or a virtual machine (VM).

As illustrated in FIG. 2, the first entity 10 comprises processing circuitry (or logic) 12. The processing circuitry 12 controls the operation of the first entity 10 and can implement the method described herein in respect of the first entity 10. The processing circuitry 12 can be configured or programmed to control the first entity 10 in the manner described herein. The processing circuitry 12 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the first entity 10. In some embodiments, the processing circuitry 12 can be configured to run software to perform the method described herein in respect of the first entity 10. The software may be containerised according to some embodiments. Thus, in some embodiments, the processing circuitry 12 may be configured to run a container to perform the method described herein in respect of the first entity 10.

Briefly, the processing circuitry 12 of the first entity 10 is configured to perform a method in response to a first request to set up a first network slice in the network. Specifically, the processing circuitry 12 of the first entity 10 is configured to identify one or more network nodes in the network and/or one or more second network slices in the network to support the first network slice. The processing circuitry 12 of the first entity 10 is configured to, for each identified network node, initiate an update to an attribute of the identified network node to add a unique identifier of the first network slice to the attribute of the identified network node. The processing circuitry 12 of the first entity 10 is configured to, for each identified second network slice, initiate an update to an attribute of the identified second network slice to add the unique identifier of the first network slice to the attribute of the identified second network slice.

As illustrated in FIG. 2, in some embodiments, the first entity 10 may optionally comprise a memory 14. The memory 14 of the first entity 10 can comprise a volatile memory or a non-volatile memory. In some embodiments, the memory 14 of the first entity 10 may comprise a non-transitory media. Examples of the memory 14 of the first entity 10 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 12 of the first entity 10 can be connected to the memory 14 of the first entity 10. In some embodiments, the memory 14 of the first entity 10 may be for storing program code or instructions which, when executed by the processing circuitry 12 of the first entity 10, cause the first entity 10 to operate in the manner described herein in respect of the first entity 10. For example, in some embodiments, the memory 14 of the first entity 10 may be configured to store program code or instructions that can be executed by the processing circuitry 12 of the first entity 10 to cause the first entity 10 to operate in accordance with the method described herein in respect of the first entity 10. Alternatively or in addition, the memory 14 of the first entity 10 can be configured to store any information, data, messages, requests, responses, indications, notifications, signals, or similar, that are described herein. The processing circuitry 12 of the first entity 10 may be configured to control the memory 14 of the first entity 10 to store information, data, messages, requests, responses, indications, notifications, signals, or similar, that are described herein.

In some embodiments, as illustrated in FIG. 2, the first entity 10 may optionally comprise a communications interface 16. The communications interface 16 of the first entity 10 can be connected to the processing circuitry 12 of the first entity 10 and/or the memory 14 of first entity 10. The communications interface 16 of the first entity 10 may be operable to allow the processing circuitry 12 of the first entity 10 to communicate with the memory 14 of the first entity 10 and/or vice versa. Similarly, the communications interface 16 of the first entity 10 may be operable to allow the processing circuitry 12 of the first entity 10 to communicate with the second entity 20, third entity 30, MIB 40, and/or any other entity. The communications interface 16 of the first entity 10 can be configured to transmit and/or receive information, data, messages, requests, responses, indications, notifications, signals, or similar, that are described herein. In some embodiments, the processing circuitry 12 of the first entity 10 may be configured to control the communications interface 16 of the first entity 10 to transmit and/or receive information, data, messages, requests, responses, indications, notifications, signals, or similar, that are described herein.

Although the first entity 10 is illustrated in FIG. 2 as comprising a single memory 14, it will be appreciated that the first entity 10 may comprise at least one memory (i.e. a single memory or a plurality of memories) 14 that operate in the manner described herein. Similarly, although the first entity 10 is illustrated in FIG. 2 as comprising a single communications interface 16, it will be appreciated that the first entity 10 may comprise at least one communications interface (i.e. a single communications interface or a plurality of communications interface) 16 that operate in the manner described herein. It will also be appreciated that FIG. 2 only shows the components required to illustrate an embodiment of the first entity 10 and, in practical implementations, the first entity 10 may comprise additional or alternative components to those shown.

Figure 3:
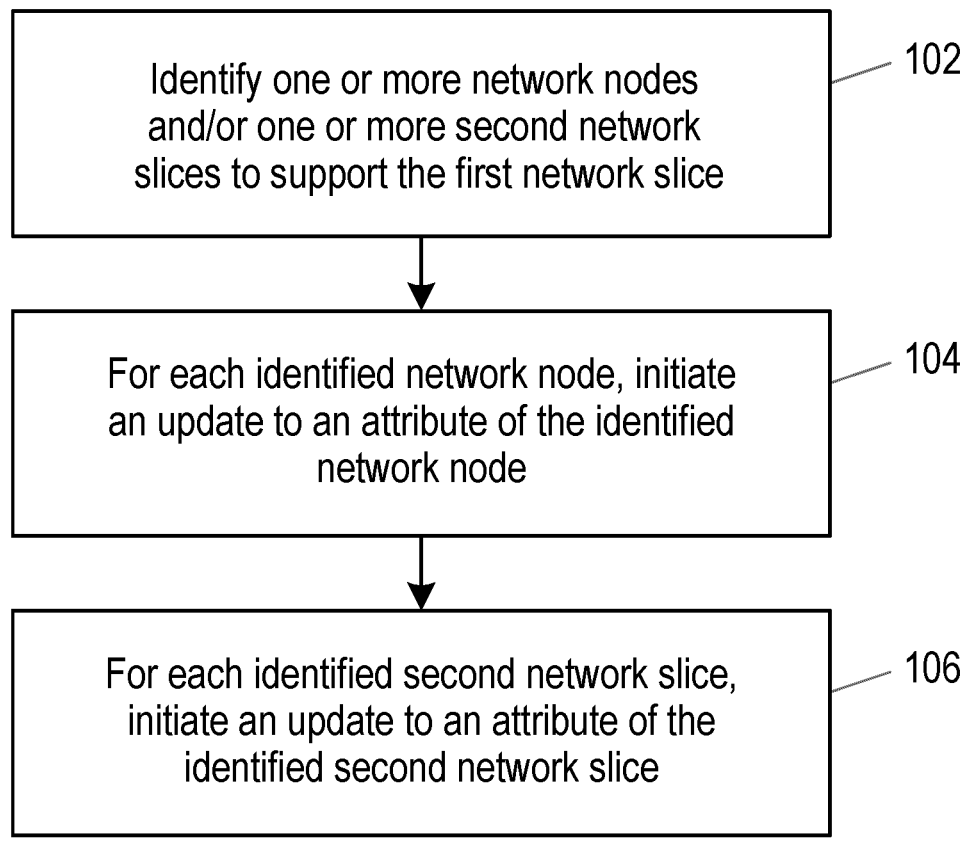
FIG. 3 is a block diagram illustrating a method performed by a first entity according to an embodiment.

FIG. 3 is a flowchart illustrating a method performed by a first entity 10 in accordance with an embodiment. The first entity 10 is configured to manage network slices in a network. The method is for network management. The first entity 10 described earlier with referenced to FIG. 2 is configured to operate in accordance with the method of FIG. 3. The method can be performed by or under the control of the processing circuitry 12 of the first entity 10. The method is performed in response to a first request to set up a first network slice in the network.

As illustrated at block 102 of FIG. 3, one or more network nodes in the network and/or one or more second network slices in the network are identified to support the first network slice. More specifically, the processing circuitry 12 of the first entity 10 identifies one or more network nodes/or one or more second network slices. In some embodiments, it may be that the first network slice is to be supported directly by one or more identified network nodes. Alternatively or in addition, it may be that the first network slice is to be supported indirectly by one or more identified network nodes, e.g. via one or more identified second network slices.

Alternatively or in addition, it may be that the first network slice is to be supported directly by one or more identified second network slices. For example, there may be multiple levels of network slices and it may be that the first network slice is to be supported by one or more second network slices from a level that is immediately lower than (or immediately below) the level of the first network slice. Thus, the one or more identified second network slices may be from the same level.

In addition, it may be that the first network slice is also to be supported indirectly by one or more identified second network slices via one or more other identified second network slices. For example, there may be multiple levels of network slices and it may be that the first network slice is to be supported by one or more second network slices from one or more levels that are even lower than that which is immediately lower than (or below) the level of the first network slice. Thus, the one or more identified second network slices may be from a plurality of different levels.

There may be any number of levels of network slices and it may be that the first network slice is to be supported by one or more second network slices from any one or more of these levels of network slices. The multiple levels can be multiple levels in a hierarchy of network slices, which may also be referred to as a network slice tree. The first network slice may be located at the apex of the hierarchy or at any other position in the hierarchy.

As illustrated at block 104 of FIG. 3, for each identified network node, an update to an attribute of the identified network node is initiated to add a unique identifier of the first network slice to the attribute of the identified network node. Herein, a unique identifier may be any form of identifier that uniquely identifies the first network slice. For example, the unique identifier may be a distinguished name (DN) or any other form of unique identifier.

In some embodiments, initiating the update to the attribute of the identified network node may comprise initiating transmission of a second request towards a second entity 20 for the attribute of the identified network node to be updated. More specifically, the processing circuitry 12 of the first entity 10 can be configured to initiate transmission of the second request towards the second entity 20. The second entity 20 is configured to manage network nodes in the network. Herein, the term "initiate" can mean, for example, cause or establish. Thus, the processing circuitry 12 of the first entity 10 can be configured to itself transmit the second request (e.g. via a communications interface 16 of the first entity 10) or can be configured to cause another entity to transmit the second request.

Thus, for each identified network node, an update to an attribute of the identified network node is initiated to add a unique identifier of the first network slice to the attribute of the identified network node. In this way, the attribute of all identified network nodes becomes a new attribute with the addition of the unique identifier of the first network slice. The identified network node(s) are those that are to support the first network slice and can thus be said to be "members of" the first network slice. The new attribute can be referred to as a membersOf attribute. The new attribute can capture the unique identifier of any network slices of which the respective network node is a member. In some embodiments, all network nodes may have a membersOf attribute, which comprises a unique identifier of any network slices of which it is a member.

As illustrated at block 106 of FIG. 3, for each identified second network slice, an update to an attribute of the identified second network slice is initiated to add the unique identifier of the first network slice to the attribute of the identified second network slice. In some embodiments, initiating the update to the attribute of the identified second network slice may comprise causing the attribute of the identified second network slice to be updated at a management information (MIB) base 40. More specifically, the processing circuitry 12 of the first entity 10 can be configured to cause this update according to some embodiments. For example, in some embodiments, the processing circuitry 12 of the first entity 10 may be configured to control the MIB 40 to update the attribute of the identified second network slice. The MIB 40 can be configured to store information on each network node in the network and each network slice in the network.

Thus, for each identified second network slice, an update to an attribute of the identified second network slice is initiated to add a unique identifier of the first network slice to the attribute of the identified second network slice. In this way, the attribute of all identified second network slices becomes a new attribute with the addition of the unique identifier of the first network slice. The identified second network slice(s) are those that are to support the first network slice and can thus be said to be "members of" the first network slice. The new attribute can be referred to as a membersOf attribute. The new attribute can capture the unique identifier of any (zero or more) network slices of which the respective second network slice is a member. In some embodiments, all network slices may have a membersOf attribute, which comprises a unique identifier of any other network slices of which it is a member.

Although not illustrated in FIG. 3, in some embodiments, the method may comprise performing certain steps in response to a third request to remove the first network slice from the network. For example, the method may comprise identifying one or more network nodes in the network and/or one or more second network slices in the network supporting the first network slice. More specifically, the processing circuitry 12 of the first entity 10 can be configured to identify these one or more network nodes and/or one or more second network slices according to some embodiments.

The method may comprise, for each identified network node, initiating removal of the unique identifier of the first network slice from the attribute of the identified network node. More specifically, the processing circuitry 12 of the first entity 10 can be configured to initiate the removal according to some embodiments. In some embodiments, initiating removal of the unique identifier of the first network slice from the attribute of the identified network node may comprise initiating transmission of a fourth request towards a second entity 20 for the unique identifier of the first network slice to be removed from the attribute of the identified network node. More specifically, the processing circuitry 12 of the first entity 10 can be configured to initiate transmission of (e.g. itself transmit, such as via a communications interface 16 of the first entity 10, or cause another entity to transmit) the fourth request towards the second entity 20. As mentioned earlier, the second entity 20 is configured to manage network nodes in the network.

The method may comprise, for each identified second network slice, initiating removal of the unique identifier of the first network slice from the attribute of the identified second network slice. More specifically, the processing circuitry 12 of the first entity 10 can be configured to initiate the removal according to some embodiments. In some embodiments, initiating removal of the unique identifier of the first network slice from the attribute of the identified second network slice may comprise causing the unique identifier of the first network slice to be removed from the attribute of the identified second network slice at a MIB 40. More specifically, the processing circuitry 12 of the first entity 10 can be configured to cause this removal according to some embodiments. For example, in some embodiments, the processing circuitry 12 of the first entity 10 may be configured to control the MIB 40 to remove the unique identifier of the first network slice. As mentioned earlier, the MIB 40 can be configured to store information on each network node in the network and each network slice in the network.

Although not illustrated in FIG. 3, in some embodiments, the method may comprise, in response to detection of an underperforming (e.g. second) network slice, initiating transmission of a report on the underperforming network slice. More specifically, the processing circuitry 12 of the first entity 10 can be configured to initiate the transmission of (e.g. itself transmit, such as via a communications interface 16 of the first entity 10, or cause another entity to transmit) the report. The report can comprise a unique identifier of the underperforming (e.g. second) network slice, a unique identifier of one or more (e.g. first) network slices supported by the underperforming network slice, and information indicating that the underperforming network slice is underperforming. Thus, the report can comprise a new parameter by way of the unique identifier of one or more network slices supported by the underperforming network slice. This new parameter may be referred to as a sliceSupporting parameter. In some embodiments, this parameter may capture the unique identifier of any network slice that the underperforming network slice (and/or a faulty network node) is supporting.

Figures 4, 5:
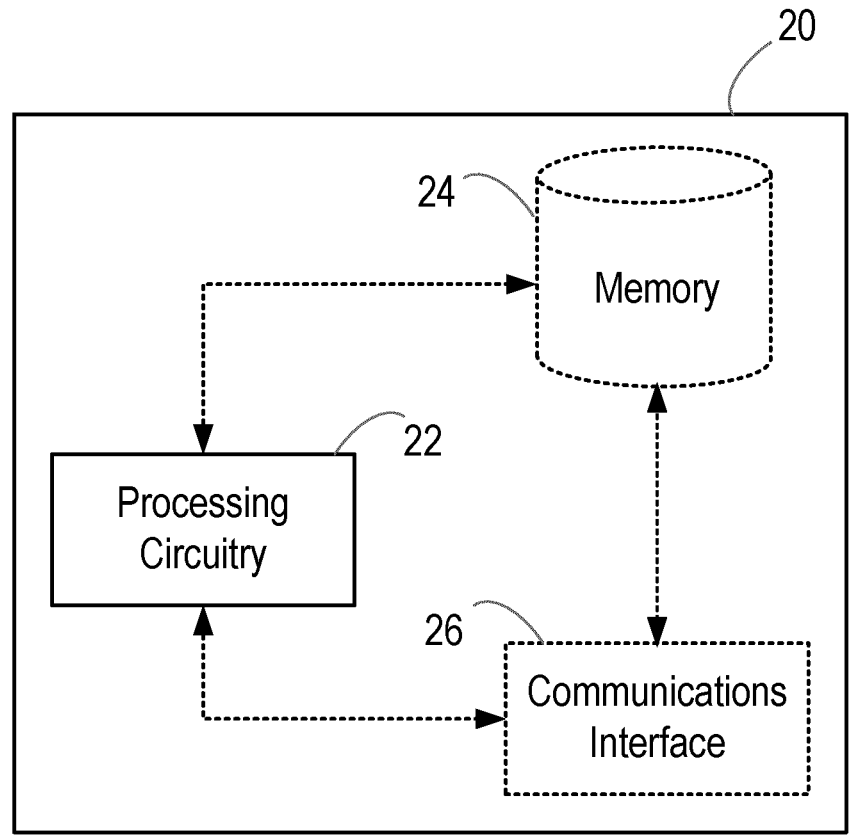
FIG. 4 is a block diagram illustrating a second entity according to an embodiment.
FIG. 5 is a block diagram illustrating a method performed by a second entity according to an embodiment.

FIG. 4 illustrates a second entity 20 in accordance with an embodiment. The second entity 20 is for managing services in a network. The second entity 20 may, for example, be a physical machine (e.g. a server) or a virtual machine (VM).

As illustrated in FIG. 4, the second entity 20 comprises processing circuitry (or logic) 22. The processing circuitry 22 controls the operation of the second entity 20 and can implement the method described herein in respect of the second entity 20. The processing circuitry 22 can be configured or programmed to control the second entity 20 in the manner described herein. The processing circuitry 22 can comprise one or more hardware components, such as one or more processors, one or more processing units, one or more multi-core processors and/or one or more modules. In particular implementations, each of the one or more hardware components can be configured to perform, or is for performing, individual or multiple steps of the method described herein in respect of the second entity 20. In some embodiments, the processing circuitry 22 can be configured to run software to perform the method described herein in respect of the second entity 20. The software may be containerised according to some embodiments. Thus, in some embodiments, the processing circuitry 22 may be configured to run a container to perform the method described herein in respect of the second entity 20.

Briefly, the processing circuitry 22 of the second entity 20 is configured to, for each network node in the network that is to support a first network slice to be set up in the network, initiate an update to an attribute of the network node to add a unique identifier of the first network slice to the attribute of the network node.

As illustrated in FIG. 4, in some embodiments, the second entity 20 may optionally comprise a memory 24. The memory 24 of the second entity 20 can comprise a volatile memory or a non-volatile memory. In some embodiments, the memory 24 of the second entity 20 may comprise a non-transitory media. Examples of the memory 24 of the second entity 20 include, but are not limited to, a random access memory (RAM), a read only memory (ROM), a mass storage media such as a hard disk, a removable storage media such as a compact disk (CD) or a digital video disk (DVD), and/or any other memory.

The processing circuitry 22 of the second entity 20 can be connected to the memory 24 of the second entity 20. In some embodiments, the memory 24 of the second entity 20 may be for storing program code or instructions which, when executed by the processing circuitry 22 of the second entity 20, cause the second entity 20 to operate in the manner described herein in respect of the second entity 20. For example, in some embodiments, the memory 24 of the second entity 20 may be configured to store program code or instructions that can be executed by the processing circuitry 22 of the second entity 20 to cause the second entity 20 to operate in accordance with the method described herein in respect of the second entity 20. Alternatively or in addition, the memory 24 of the second entity 20 can be configured to store any information, data, messages, requests, responses, indications, notifications, signals, or similar, that are described herein. The processing circuitry 22 of the second entity 20 may be configured to control the memory 24 of the second entity 20 to store information, data, messages, requests, responses, indications, notifications, signals, or similar, that are described herein.

In some embodiments, as illustrated in FIG. 4, the second entity 20 may optionally comprise a communications interface 26. The communications interface 26 of the second entity 20 can be connected to the processing circuitry 22 of the second entity 20 and/or the memory 24 of second entity 20. The communications interface 26 of the second entity 20 may be operable to allow the processing circuitry 22 of the second entity 20 to communicate with the memory 24 of the second entity 20 and/or vice versa. Similarly, the communications interface 26 of the second entity 20 may be operable to allow the processing circuitry 22 of the second entity 20 to communicate with the first entity 10, the third entity 30, the MIB 40, the one or more network nodes 50, and/or any other entity. The communications interface 26 of the second entity 20 can be configured to transmit and/or receive information, data, messages, requests, responses, indications, notifications, signals, or similar, that are described herein. In some embodiments, the processing circuitry 22 of the second entity 20 may be configured to control the communications interface 26 of the second entity 20 to transmit and/or receive information, data, messages, requests, responses, indications, notifications, signals, or similar, that are described herein.

Although the second entity 20 is illustrated in FIG. 4 as comprising a single memory 24, it will be appreciated that the second entity 20 may comprise at least one memory (i.e. a single memory or a plurality of memories) 24 that operate in the manner described herein. Similarly, although the second entity 20 is illustrated in FIG. 4 as comprising a single communications interface 26, it will be appreciated that the second entity 20 may comprise at least one communications interface (i.e. a single communications interface or a plurality of communications interface) 26 that operate in the manner described herein. It will also be appreciated that FIG. 4 only shows the components required to illustrate an embodiment of the second entity 20 and, in practical implementations, the second entity 20 may comprise additional or alternative components to those shown.

FIG. 5 is a flowchart illustrating a method performed by a second entity 20 in accordance with an embodiment. The second entity 20 is configured to manage network nodes in a network. The method is for network management. The second entity 20 described earlier with referenced to FIG. 4 is configured to operate in accordance with the method of FIG. 5. The method can be performed by or under the control of the processing circuitry 22 of the second entity 20.

As illustrated at block 202 of FIG. 5, for each network node (e.g. base station, function, etc.) in the network that is to support a first network slice to be set up in the network, an update to an attribute of the network node is initiated to add a unique identifier of the first network slice to the attribute of the network node. More specifically, the processing circuitry 22 of the second entity 20 initiates the update to the attribute of the network node. In some embodiments, it may be that the first network slice is to be supported directly by one or more network nodes in the network and/or indirectly by one or more network nodes in the network via one or more second network slices in the network.

In some embodiments, initiating the update to the attribute of the network node may comprise causing the attribute of the network node to be updated at the MIB 40. More specifically, the processing circuitry 22 of the second entity 20 can be configured to cause this update according to some embodiments. For example, in some embodiments, the processing circuitry 22 of the second entity 20 may be configured to control the MIB 40 to update the attribute of the network node. As mentioned earlier, the MIB 40 can be configured to store information on each network node in the network and each network slice in the network. In some embodiments, the method may comprise initiating the update to the attribute of the network node in response to a second request for the attribute of the network node to be updated.

Although not illustrated in FIG. 5, in some embodiments, the method may comprise certain steps in response to a fourth request for the unique identifier of the first network slice to be removed from an attribute of one or more network nodes in the network supporting the first network slice. For example, in some embodiments, the method may comprise causing the unique identifier of the first network slice to be removed from the attribute of the one or more network nodes at the MIB 40. More specifically, the processing circuitry 22 of the second entity 20 can be configured to cause this removal according to some embodiments. For example, in some embodiments, the processing circuitry 22 of the second entity 20 may be configured to control the MIB 40 to remove the unique identifier of the first network slice from the attribute of the one or more network nodes according to some embodiments. As mentioned earlier, the MIB 40 can be configured to store information on each network node in the network and each network slice in the network.

Although also not illustrated in FIG. 5, in some embodiments, the method may comprise certain steps in response to detection of a faulty network node in the network. For example, in some embodiments, the method may comprise acquiring, from an attribute of the faulty network node, a unique identifier of each network slice that the faulty network node is supporting. More specifically, the processing circuitry 22 of the second entity 20 can be configured to acquire the unique identifier of each network slice that the faulty network node is supporting according to some embodiments. In some of these embodiments, the method may comprise initiating transmission of a report on the faulty network node. More specifically, the processing circuitry 22 of the second entity 20 can be configured to initiate transmission of (e.g. itself transmit, such as via a communications interface 26 of the second entity 20, or cause another entity to transmit) the report on the faulty network node according to some embodiments. The report may comprise a unique identifier of the faulty network node and the acquired unique identifier of each network slice that the faulty network node is supporting.

In some embodiments, the method may comprise, in response to detection of a faulty network node in the network, acquiring, from an attribute of each network slice that the faulty network node is supporting, a unique identifier of each additional network slice supported by each network slice that the faulty network node is supporting. More specifically, the processing circuitry 22 of the second entity 20 can be configured to acquire the unique identifier of each additional network slice according to some embodiments. In some of these embodiments, the method may comprise initiating transmission of a report on the faulty network node. More specifically, the processing circuitry 22 of the second entity 20 can be configured to initiate transmission of (e.g. itself transmit, such as via a communications interface 26 of the second entity 20, or cause another entity to transmit) the report on the faulty network node according to some embodiments. The report may comprise a unique identifier of the faulty network node and the acquired unique identifier of each additional network slice.

In any of the embodiments involving a report, the method may comprise initiating transmission of the report towards a first entity 10 and/or initiating transmission of the report towards the third entity 30. As described earlier, the first entity 10 is configured to manage network slices in a network. As also described earlier, the third entity 30 is configured to operate the network.

An example of the operation of the first entity 10 and the second entity 20 will now be described. In this example, when the first entity 10 uses the concept of network slicing to construct customised network slices (which, as mentioned earlier, are logical networks), the first entity may perform the following steps via the second entity 20:

(a) Create a new first network slice with a unique identifier, such as a DN (e.g. DN-1).
(b) Identify the managed network node(s), e.g. function(s), and existing second network slice(s) which would be members of (required to support) the first network slice (DN-1).
(c) If the second entity is unable to make such an identification (e.g. if there is a lack of required network nodes), the operation may fail; otherwise, the operation may continue.
(d) For each identified network node, add the unique identifier of the first network slice (DN-1) into its membersOf attribute.

(e) For each identified second network slice, add the unique identifier of the first network slice (DN-1) into its membersOf attribute.

An alarm report reporting a faulty network node (e.g. function) may carry the unique identifier (e.g. DN) of the faulty network node and, in addition, the sliceSupporting parameter mentioned earlier. This parameter may comprise the content of the faulty network node's membersOf attribute.

The attributes and parameter described herein can be added to standardised classes and standardised alarm reports, as follows:

Network node class attribute (e.g. managed function class attribute)—This class can represent a network node (e.g. base station, function, etc.), such as a network node under management. This class can have one or more attributes that collectively define the behaviour of a network node or an instance of a network node. The attribute can be added to standardised class network node (e.g. managed function).

| Attribute Name | Description |
| --- | --- |
| memberOf | It is zero or more unique identifiers (e.g. DNs) of network slice(s) that this network node (e.g. base station, function, etc.) is supporting. |

Network slice class attribute—This attribute can be added to the standardised class about network slice and network slice subnet, which may comprise various attributes, such as a unique identifier (e.g. DN) of a network slice or network slice subnet, properties of a network slice or network slice subnet, etc.

| Attribute Name | Description |
| --- | --- |
| memberOf | It is zero or more unique identifiers (e.g. DNs) of network slice(s) that (this) network slice is supporting. |

Alarm report parameter—This parameter can be added to the standardised alarm report, which may comprise various parameters, such as a unique identifier (e.g. DN) of a faulty entity (e.g. network node or network slice), a probable cause of the fault, a severity of the fault, a time of day of the fault occurrence, etc.

| Attribute Name | Description |
| --- | --- |
| sliceSupporting | It is zero or more unique identifiers (e.g. DNs) of entity(s) that are supported by the faulty network node (e.g. function). |

The identity of one or more network slices supported directly by a network node (e.g. function) may be registered in the network node's memberOf attribute. The identity of one or more network slices supported indirectly by a network node (e.g. function) may not be registered in the network node's memberOf attribute but can be found by navigating via the directly supported network slice's memberOf attribute. This facilitates the task of a network event correlation in that a large volume of network events (such as configuration changes of one or more network nodes, alarm reporting of underperforming network slices, etc.) can be partitioned into sets such that there is a high probability that events of one set are caused by the same event and events of different sets are not caused by the same event.

Figure 6A:
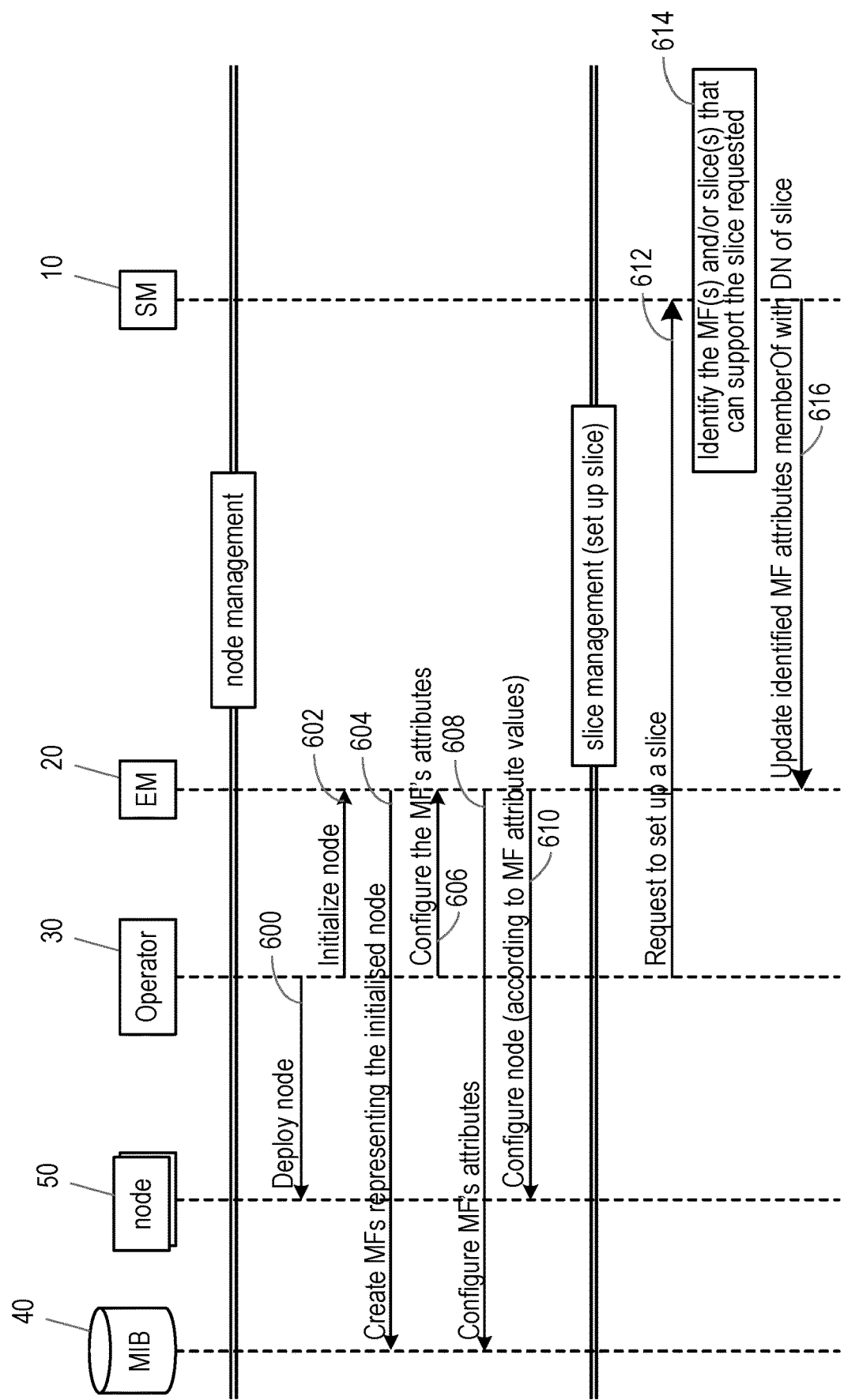
FIG. 6A-B is a signalling diagram illustrating an exchange of signals in a system according to an embodiment.
Figure 6B:
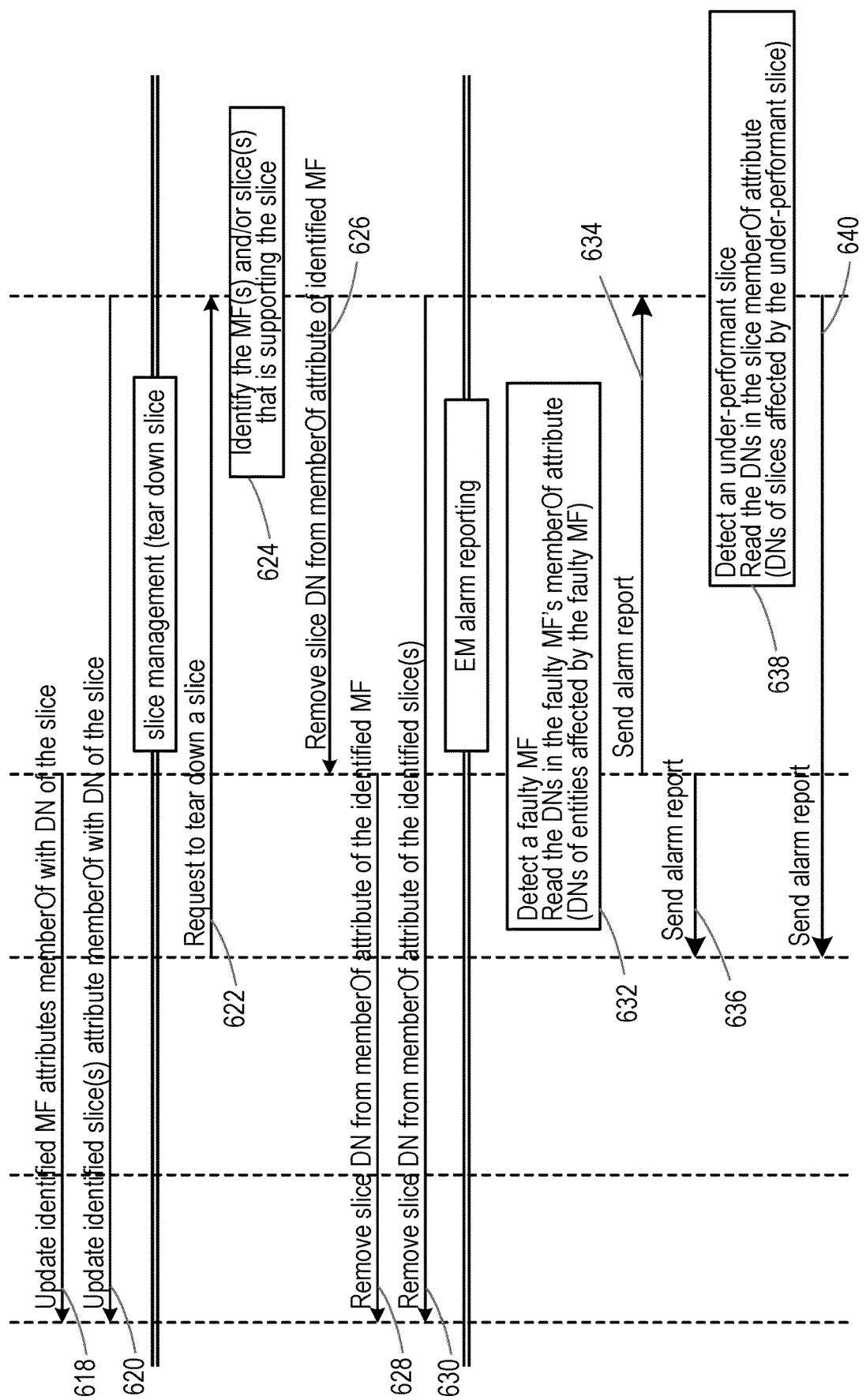

FIG. 6A-B is a signalling diagram illustrating an exchange of signals in a system according to an embodiment. The system may, for example, be the system described earlier with reference to FIG. 1. The system illustrated in FIG. 6A-B comprises the MIB 40, at least one network node 50, the third entity (e.g. operator terminal) 30, the second entity (e.g. network node manager, or network element manager, EM) 20, and the first entity 10 (e.g. network slice manager, SM). The first entity 10 can be as described earlier with reference to FIGS. 2 and 3. The first entity 10 is configured to manage one or more network slices in the network. The second entity 20 can be as described earlier with reference to FIGS. 4 and 5. The second entity 20 is configured to manage one or more network nodes in the network, such as the at least one network node 50. The third entity 30 can be for use by an operator for managing a network.

FIG. 6A-B will now be described with reference to FIGS. 1 and 6A-B. FIG. 6A-B illustrates four methods that may be performed by the system, namely a node management method, a first slice management (or, more specifically, a slice set up) method, a second slice management (or, more specifically, a slice tear down) method, and an alarm reporting method. Any one or more of these four methods may be performed by the system.

The node management method is illustrated by arrows 600 to 610 in FIG. 6A. As illustrated by arrow 600 of FIG. 6A, the third entity 30 deploys a network node 50. For example, the third entity 30 can initiate transmission of a request towards the network node 50 to deploy the network node 50. As illustrated by arrow 602 of FIG. 6A, the third entity 30 initiates transmission of a request towards the second entity 20 for the second entity 20 to configure the network node 50. As illustrated by arrow 604 of FIG. 6A, the second entity 20 creates a software object (e.g. one or more managed functions, MFs) in the MIB 40 representing the deployed network node 50.

As illustrated by arrow 606 of FIG. 6A, the third entity 30 initiates transmission of a request towards the second entity 20 for the second entity 20 to configure the software object (e.g. one or more managed MFs) created in the MIB 40. As illustrated by arrow 608 of FIG. 6A, the second entity 20 configures one or more attributes of the software object in the MIB 40. As illustrated by arrow 610 of FIG. 6A, the second entity 20 configures the one or more attributes of the network node 50 corresponding to the configured software object in the MIB 40.

The first slice management (or, more specifically, a slice set up) method is illustrated by arrow 612, block 614, and arrow 616 in FIG. 6A and arrows 618 and 620 in FIG. 6B. As illustrated by arrow 612 of FIG. 6A, the third entity 30 initiates transmission of a first request towards the first entity 10 for the first entity 10 to set up (or create) a network slice in the network. In some embodiments, the third entity 30 may request that the network slice is set up with one or more predefined properties, e.g. satisfying an operator's client requirement(s). For example, a deployed network may have one network slice (S-1) that contains two network nodes, such as two MFs (MF-1, MF-2) and MFs (MF-3, MF-4, MF-5).

As illustrated by block 614 of FIG. 6A, in response to the first request, the first entity 10 identifies one or more network nodes (e.g. MFs) in the network and/or one or more second network slices in the network to support the first network slice. More specifically, the first entity 10 identifies one or more network nodes (e.g. MFs) and/or one or more second network slices.

As illustrated by arrows 616 of FIG. 6A and 618 of FIG. 6B, for each identified network node, the first entity 10 initiates an update to an attribute of the identified network node to add a unique identifier of the first network slice to the attribute of the identified network node. In more detail, as illustrated by arrow 616 of FIG. 6A, the first entity 10 initiates transmission of a second request towards the second entity 20 for the attribute of each identified network node to be updated and, as illustrated by arrow 618 of FIG. 6B, the second entity 20 initiates the update to the attribute of each identified network node to add the unique identifier of the first network slice to the attribute of the identified network node. More specifically, the second entity 20 causes the attribute of each identified network node to be updated at the MIB 40.

As illustrated by arrow 620 of FIG. 6B, for each identified second network slice, the first entity 10 initiates an update to an attribute of the identified second network slice to add the unique identifier of the first network slice to the attribute of the identified second network slice. In more detail, as illustrated by arrow 620 of FIG. 6B, the first entity 10 causes the attribute of each identified second network slice to be updated at the MIB 40.

In a first example of the slice management method, at block 614 of FIG. 6A, the first entity 10 may identify two network nodes or, more specifically, two MFs (MF-4 and MF-5) that can support a new first network slice. That is, the first entity 10 may identify that the first network slice is to contain these two MFs. The first entity 10 may decide the unique identifier (e.g. DN) of the first network slice (S-100). In this first example, at arrow 616 of FIG. 6A, the first entity 10 may request that the second entity 20 adds the unique identifier of the first network slice (S-100) to the attribute of the identified MFs (MF-4 and MF-5). At arrow 618 of FIG. 6B, the second entity 20 may add the unique identifier of the first network slice (S-100) to the attribute of the identified MFs (MF-4 and MF-5). In this first example, the step illustrated at arrow 620 of FIG. 6B is not performed. Instead, the first entity 10 creates the first network slice in the MIB 40.

In a second example of the slice management method, at block 614 of FIG. 6A, the first entity 10 may identify a second network slice (S-1) and a network node or, more specifically, an MF (MF-5) that can support a new first network slice. That is, the first entity 10 may identify that the first network slice is to contain this second network slice (S-1) and MF (MF-5). The first entity 10 may decide the unique identifier (e.g. DN) of the first network slice (S-100). In this second example, at arrow 616 of FIG. 6A, the first entity 10 may request that the second entity 20 adds the unique identifier of the first network slice (S-100) to the attribute of the identified MF (MF-5). At arrow 618 of FIG. 6B, the second entity 20 may add the unique identifier of the first network slice (S-100) to the attribute of the identified MF (MF-5). At arrow 620 of FIG. 6B, the first entity 10 may create the first network slice in the MIB 40 and add the unique identifier of the first network slice (S-100) to the attribute of the identified second network slice (S-1).

The second slice management (or, more specifically, a slice tear down) method is illustrated by arrow 622, block 624, and arrows 626 to 630 in FIG. 6B. As illustrated by arrow 622 of FIG. 6B, the third entity 30 initiates transmission of a third request towards the first entity 10 for the first entity 10 to remove (or tear down) the first network slice (S-100) from the network. As illustrated by block 624 of FIG. 6B, in response to the third request, the first entity 10 identifies one or more network nodes in the network and/or one or more second network slices (S-1) in the network to support the first network slice (S-100).

As illustrated by arrow 626 of FIG. 6B, for each identified network node, the first entity initiates removal of the unique identifier of the first network slice (S-100) from the attribute of the identified network node. More specifically, as illustrated by arrow 626 of FIG. 6B, the first entity 10 initiates transmission of a fourth request towards the second entity 20 for the unique identifier of the first network slice (S-100) to be removed from the attribute of each identified network node. As illustrated by arrow 628 of FIG. 6B, the second entity 20 initiates removal of the unique identifier of the first network slice (S-100) from the attribute of each identified second network slice (S-1). More specifically, the second entity 20 causes the unique identifier of the first network slice (S-100) to be removed from the attribute of each identified second network slice (S-1) at the MIB 40.

As illustrated by arrow 630 of FIG. 6B, for each identified second network slice (S-1), the first entity 10 initiates removal of the unique identifier of the first network slice (S-100) from the attribute of each identified second network slice (S-1). More specifically, the first entity 10 causes the unique identifier of the first network slice (S-100) to be removed from the attribute of each identified second network slice (S-1) at the MIB 40.

In an example of the second slice management method, such as the second example described earlier, at arrow 622 of FIG. 6B, the third entity 30 may request that the first entity 10 removes (or tears down) the first network slice (S-100). In this second example, at block 624 of FIG. 6B, the first entity 10 identifies that the first network slice (S-100) is supported by a second network slice (S-1) and a network node or, more specifically, an MF (MF-5). At arrow 626 of FIG. 6B, the first entity 10 may request that the second entity 20 removes the unique identifier (e.g. DN) of the first network slice (S-100) from the MF (MF-5). At arrow 628 of FIG. 6B, the second entity 20 may remove the unique identifier of the first network slice (S-100) from the MF (MF-5) in the MIB 40. At arrow 630 of FIG. 6B, the first entity 10 may remove the unique identifier of the first network slice (S-100) from the second network slice (S-1) in the MIB 40. The first entity 10 may then delete the first network slice (S-100) from the MIB.

The alarm reporting method is illustrated by block 632, arrows 634 to 636, block 638, and arrow 640 in FIG. 6B. As illustrated by block 632 of FIG. 6B, the second entity 20 may detect a faulty network node in the network. In response to this detection, the second entity 20 may acquire (e.g. read), from an attribute of the faulty network node, a unique identifier of each network slice that the faulty network node is supporting. Also, in response to this detection, the second entity 20 may acquire (e.g. read), from an attribute of each network slice that the faulty network node is supporting, a unique identifier of each additional network slice supported by each network slice that the faulty network node is supporting.

As illustrated by arrows 634 and 636 of FIG. 6B, the second entity 20 initiates transmission of a report on the faulty network node. More specifically, as illustrated by arrow 634 of FIG. 6B, the second entity 20 initiates transmission of the report towards the first entity 10 and, as illustrated by arrow 636 of FIG. 6B, the second entity 20 initiates transmission of the report towards the third entity 30. The report comprises a unique identifier of the faulty network node, the acquired unique identifier of each network slice that the faulty network node is supporting, and the acquired unique identifier of each additional network slice supported by each network slice that the faulty network node is supporting. The report may also be referred to as an "alarm report".

As illustrated by block 638 of FIG. 6B, the first entity 10 may detect that there is an underperforming network slice. In response to this detection, the first entity 10 may acquire (e.g. reads), from an attribute of the underperforming network slice, a unique identifier of each network slice that the underperforming network slice is supporting. As illustrated by arrow 640 of FIG. 6B, the first entity 10 may initiate transmission of a report on the underperforming network slice. More specifically, the first entity 10 initiates transmission of the report towards the third entity 30. The report comprises a unique identifier of the underperforming network slice, a unique identifier of one or more network slices supported by the underperforming network slice, and information indicating that the underperforming network slice is underperforming.

In an example of the alarm reporting method, such as the first example described earlier, at block 632 of FIG. 6B, the second entity 20 may detect a fault in a network node or, more specifically, an MF (MF-5). In this first example, at arrow 634 of FIG. 6B, the second entity 20 may send an alarm report to the first entity 10. At arrow 636 of FIG. 6B, the second entity 20 may send the alarm report to the third entity 30. This alarm report may carry the unique identifier (e.g. DN) of the faulty MF (MF-5) and a parameter carrying the content of the attribute of the faulty MF (MF-5). At block 638 of FIG. 6B, after detecting an underperforming network slice due to the faulty MF (MF-5), the first entity 10 may send an alarm report to the third entity 30. This alarm report may carry the unique identifier (e.g. DN) of the first network slice (S-100) and an indication that the first network slice (S-100) has an underperformance issue.

In another example of the alarm reporting method, such as the second example described earlier, at block 632 of FIG. 6B, the second entity 20 may detect a fault in a network node or, more specifically, an MF (MF-1). In this first example, at arrow 634 of FIG. 6B, the second entity 20 may send an alarm report to the first entity 10. At arrow 636 of FIG. 6B, the second entity 20 may send the alarm report to the third entity 30. This alarm report may carry the unique identifier (e.g. DN) of the faulty MF (MF-1) and a parameter carrying the content of the attribute of a second network slice (S-1). At block 638 of FIG. 6B, after detecting that the faulty MF (MF-1) affects the performance of the second network slice (S-1) and that this in turn affects the performance of the first network slice (S-100), the first entity 10 may send an alarm report to the third entity 30. This alarm report may carry the unique identifier (e.g. DN) of the first network slice (S-100) and an indication that the first network slice (S-100) has an underperformance issue.

Figure 7:
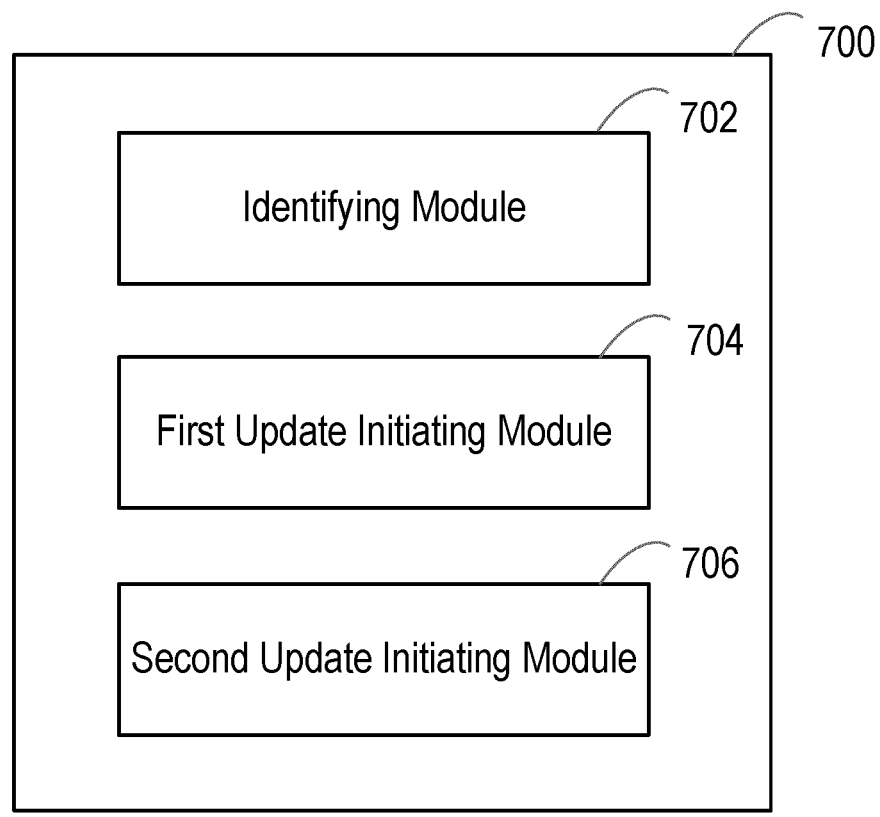
FIG. 7 is a block diagram illustrating a first entity according to an embodiment.

FIG. 7 is a block diagram illustrating a first entity 700 in accordance with an embodiment. The first entity 700 can manage network slices in a network. The first entity 700 operates in response to a first request to set up a first network slice in the network. The first entity 700 comprises an identifying module 702 configured to identify one or more network nodes in the network and/or one or more second network slices in the network to support the first network slice. The first entity 700 comprises a first update initiating module 704 configured to, for each identified network node, initiate an update to an attribute of the identified network node to add a unique identifier of the first network slice to the attribute of the identified network node. The first entity 700 comprises a second update initiating module 706 configured to, for each identified second network slice, initiating an update to an attribute of the identified second network slice to add the unique identifier of the first network slice to the attribute of the identified second network slice. The first entity 700 may operate in the manner described herein in respect of the first entity.

Figure 8:
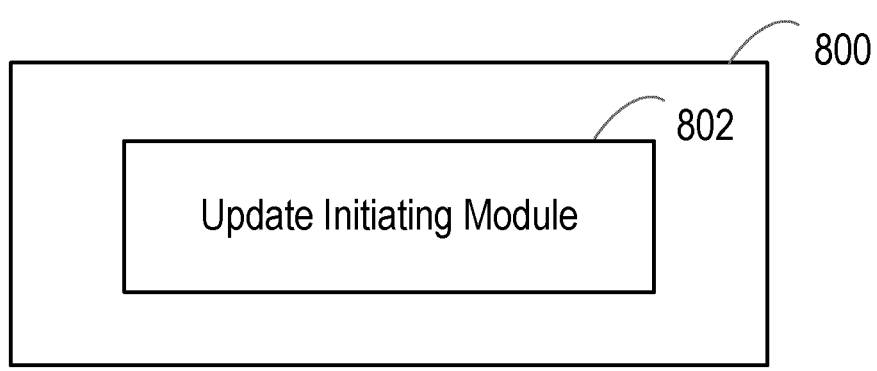
FIG. 8 is a block diagram illustrating a second entity according to an embodiment.

FIG. 8 is a block diagram illustrating a second entity 800 in accordance with an embodiment. The second entity 20 can manage network nodes in a network. The second entity 800 comprises an update initiating module 802 configured to, for each network node in the network that is to support a first network slice to be set up in the network, initiate an update to an attribute of the network node to add a unique identifier of the first network slice to the attribute of the network node. The second entity 800 may operate in the manner described herein in respect of the second entity.

There is also provided a computer program comprising instructions which, when executed by processing circuitry (such as the processing circuitry 12 of the first entity 10 described earlier and/or the processing circuitry 22 of the second entity 20 described earlier), cause the processing circuitry to perform at least part of the method described herein. There is provided a computer program product, embodied on a non-transitory machine-readable medium, comprising instructions which are executable by processing circuitry (such as the processing circuitry 12 of the first entity 10 described earlier and/or the processing circuitry 22 of the second entity 20 described earlier) to cause the processing circuitry to perform at least part of the method described herein. There is provided a computer program product comprising a carrier containing instructions for causing processing circuitry (such as the processing circuitry 12 of the first entity 10 described earlier and/or the processing circuitry 22 of the second entity 20 described earlier) to perform at least part of the method described herein. In some embodiments, the carrier can be any one of an electronic signal, an optical signal, an electromagnetic signal, an electrical signal, a radio signal, a microwave signal, or a computer-readable storage medium.

In some embodiments, the first entity functionality and/or the second entity functionality described herein can be performed by hardware. Thus, in some embodiments, any one or more of the first entity 10 and the second entity 20 described herein can be a hardware entity. However, it will also be understood that optionally at least part or all of the first entity functionality and/or the second entity functionality described herein can be virtualized. For example, the functions performed by any one or more of the first entity 10 and the second entity 20 described herein can be implemented in software running on generic hardware that is configured to orchestrate the entity functionality. Thus, in some embodiments, any one or more of the first entity 10 and the second entity 20 described herein can be a virtual entity. In some embodiments, at least part or all of the first entity functionality and/or the second entity functionality described herein may be performed in a network enabled cloud. The first entity functionality and/or the second entity functionality described herein may all be at the same location or at least some of the entity functionality may be distributed.

It will be understood that at least some or all of the method steps described herein can be automated in some embodiments. That is, in some embodiments, at least some or all of the method steps described herein can be performed automatically.

Thus, in the manner described herein, there is advantageously provided an improved technique for network management.

It should be noted that the above-mentioned embodiments illustrate rather than limit the idea, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for network management performed by a first entity configured to manage network slices of a network, the method comprising:
   performing the following operations in response to a first request to set up a first network slice in the network:
      identifying one or more of the following in the network to support the first network slice: one or more network nodes, and one or more second network slices;
      for each identified network node, initiating an update to an attribute of the identified network node to add a unique identifier of the first network slice to the attribute of the identified network node; and
      for each identified second network slice, initiating an update to an attribute of the identified second network slice to add the unique identifier of the first network slice to the attribute of the identified second network slice.

2. The method of claim 1, wherein the first network slice is to be supported according to one or more of the following:
   directly by one or more identified network nodes; and
   indirectly by one or more identified network nodes via one or more identified second network slices.

3. The method of claim 1, wherein the first network slice is to be supported according to one of the following:
   directly by one or more identified second network slices; or
   indirectly by one or more identified second network slices via one or more other identified second network slices.

4. The method of claim 1, wherein:
   initiating the update to the attribute of the identified network node comprises initiating transmission of a second request towards a second entity for the attribute of the identified network node to be updated; and
   the second entity is configured to manage network nodes in the network.

5. The method of claim 1, wherein initiating the update to the attribute of the identified second network slice comprises causing the attribute of the identified second network slice to be updated at a management information base configured to store information on each network node in the network and on each network slice in the network.

6. The method of claim 1, further comprising performing the following in response to a third request to remove the first network slice from the network:
   identifying one or more network nodes in the network and/or one or more second network slices in the network supporting the first network slice;
   for each identified network node, initiating removal of the unique identifier of the first network slice from the attribute of the identified network node; and
   for each identified second network slice, initiating removal of the unique identifier of the first network slice from the attribute of the identified second network slice.

7. The method of claim 6, wherein:
   initiating removal of the unique identifier of the first network slice from the attribute of the identified network node comprises initiating transmission of a fourth request towards a second entity for the unique identifier of the first network slice to be removed from the attribute of the identified network node; and
   the second entity is configured to manage network nodes in the network.

8. The method of claim 6, wherein initiating removal of the unique identifier of the first network slice from the attribute of the identified second network slice comprises causing the unique identifier of the first network slice to be removed from the attribute of the identified second network slice at a management information base configured to store information on each network node in the network and each network slice in the network.

9. The method of claim 1, further comprising, in response to detection of an underperforming network slice, initiating transmission of a report on the underperforming network slice, wherein the report includes:
   a unique identifier of the underperforming network slice,
   a unique identifier of one or more network slices supported by the underperforming network slice, and
   information indicating that the underperforming network slice is underperforming.

10. The method of claim 9, further comprising initiating transmission of the report towards a third entity configured to operate the network.

11. A first entity configured to manage network slices of a network, the first entity comprising:
    processing circuitry; and
    at least one memory operably coupled to the processing circuitry and having stored therein instructions that, when executed by the processing circuitry, configure the first entity to perform operations corresponding to the method of claim 1.

* * * * *

UNITED STATES PATENT AND TRADEMARK OFFICE
CERTIFICATE OF CORRECTION

PATENT NO. : 11,956,125 B2
APPLICATION NO. : 17/908170
DATED : April 9, 2024
INVENTOR(S) : Tse et al.

It is certified that error appears in the above-identified patent and that said Letters Patent is hereby corrected as shown below:

In the Specification

In Column 10, Line 20, delete "(MIB) base" and insert -- base (MIB) --, therefor.

In Column 18, Line 4, delete "initiates" and insert -- 10 initiates --, therefor.

Signed and Sealed this
Eighteenth Day of June, 2024

Katherine Kelly Vidal
*Director of the United States Patent and Trademark Office*